(12) United States Patent
Plichon et al.

(10) Patent No.: US 10,562,201 B2
(45) Date of Patent: Feb. 18, 2020

(54) APPLIANCE FOR CUTTING FRUIT OR VEGETABLES

(71) Applicant: SEB S.A., Ecully (FR)

(72) Inventors: Stéphane Plichon, Allonzier-la Caille (FR); David Benoit, Gruffy (FR)

(73) Assignee: SEB S.A., Ecully (FR)

( * ) Notice: Subject to any disclaimer, the term of this patent is extended or adjusted under 35 U.S.C. 154(b) by 54 days.

(21) Appl. No.: 15/580,470

(22) PCT Filed: May 17, 2016

(86) PCT No.: PCT/FR2016/051162
§ 371 (c)(1),
(2) Date: Dec. 7, 2017

(87) PCT Pub. No.: WO2016/198760
PCT Pub. Date: Dec. 15, 2016

(65) Prior Publication Data
US 2018/0162003 A1     Jun. 14, 2018

(30) Foreign Application Priority Data
Jun. 8, 2015   (FR) ...................................... 15 55210

(51) Int. Cl.
| B26D 1/06 | (2006.01) |
| B26D 3/26 | (2006.01) |
| B26D 3/28 | (2006.01) |
| B26D 7/01 | (2006.01) |
| B26D 7/00 | (2006.01) |

(Continued)

(52) U.S. Cl.
CPC ................. B26D 1/06 (2013.01); B26D 3/26 (2013.01); B26D 3/28 (2013.01); B26D 3/283 (2013.01);
(Continued)

(58) Field of Classification Search
CPC ..... A47J 43/25; B26D 1/06; B26D 2003/285; B26D 2007/0018; B26D 3/26; B26D 3/28;
(Continued)

(56) References Cited

U.S. PATENT DOCUMENTS 1,605,770 A * 11/1926 Potter ................... B26B 29/063
                                                    83/762
2,102,859 A * 12/1937 Spousta ................... B26D 1/25
                                                    83/167
(Continued)

FOREIGN PATENT DOCUMENTS

CN     202 053 285 U      11/2011
CN      202053285 U  *   11/2011
(Continued)

OTHER PUBLICATIONS

International Search Report as issued in International Patent Application No. PCT/FR2016/051162, dated Jul. 27, 2016.

*Primary Examiner* — Stephen Choi
(74) *Attorney, Agent, or Firm* — Pillsbury Winthrop Shaw Pittman LLP

(57) ABSTRACT

An appliance for cutting food, particularly fruit and vegetables, includes a base and at least one cutting blade. The base includes a surface for receiving the food and a device for translatably guiding the cutting blade that is to be moved back and forth by the user over the food.

18 Claims, 3 Drawing Sheets

(51) Int. Cl.
*A47J 43/25* (2006.01)
*B26D 5/10* (2006.01)

(52) U.S. Cl.
CPC ............... *A47J 43/25* (2013.01); *B26D 5/10* (2013.01); *B26D 7/01* (2013.01); *B26D 2003/285* (2013.01); *B26D 2007/0018* (2013.01)

(58) Field of Classification Search
CPC .......... B26D 3/203; B26D 3/283; B26D 5/10; B26D 7/01; Y10T 83/222; Y10T 83/9493; Y10T 83/6492
See application file for complete search history.

(56) References Cited

U.S. PATENT DOCUMENTS

| | | | |
|---|---|---|---|
| 2,480,717 A * | 8/1949 | Dodegge | B26D 3/283 83/699.61 |
| 2,583,595 A * | 1/1952 | Rodel | B26D 3/20 241/94 |
| 3,713,470 A * | 1/1973 | Muller | B26D 1/143 83/718 |
| 4,722,132 A * | 2/1988 | Ciolkevich | B26D 3/28 156/134 |
| 4,890,525 A * | 1/1990 | Bilbao | B26B 29/06 30/124 |
| 2008/0156204 A1 * | 7/2008 | Cohen | B26D 3/283 99/492 |
| 2008/0168660 A1 | 7/2008 | Chiu | |
| 2011/0094111 A1 * | 4/2011 | Hauser | B26D 3/283 30/286 |
| 2017/0106551 A1 * | 4/2017 | Bernede | B26D 1/06 |

FOREIGN PATENT DOCUMENTS

| | | |
|---|---|---|
| EP | 1 410 882 A1 | 4/2004 |
| GB | 191201202 A * | 2/1912 |
| GB | 2349805 A * | 11/2000 |
| WO | WO 2005/090029 A1 | 9/2005 |

* cited by examiner

APPLIANCE FOR CUTTING FRUIT OR VEGETABLES

CROSS-REFERENCE TO RELATED APPLICATIONS

This application is the U.S. National Stage of PCT/FR2016/051162, filed May 17, 2016, which in turn claims priority to French patent application number 1555210 filed Jun. 8, 2015. The content of these applications are incorporated herein by reference in their entireties.

This invention concerns an appliance for cutting foods, in particular fruit and vegetables, that is intended to be used for food preparation, in particular for slicing or grating. More specifically, the invention concerns a cutting appliance equipped with a cutting blade intended to be moved back and forth over the food by the user. This type of hand-held appliance is commonly called a mandolin.

From the document EP1410882 in particular, we are aware of an appliance for cutting foods, in particular fruit or vegetables, comprising a base in which is positioned a cutting plate equipped with a cutting blade and a handle slidably positioned on the base. The handle includes a housing for receiving the food to be cut. To cut the food, the user pushes the food in a back-and-forth movement against the cutting blade using the handle.

However, the housing for receiving the food is small and is not always able to properly hold the food to be cut. This causes users not to use the handle and to use their hands to hold the food to be cut and move it directly over the cutting blade. This type of use may lead to accidents, including cuts to the fingers, and is therefore particularly dangerous.

In addition, with such a cutting appliance long foods such as cucumbers or carrots can only be cut into rounds. In fact, because of the shape of the housing for receiving the food, long foods can only be in a vertical position above the cutting blade.

In addition, the cut food falls on the work surface. The user may possibly position a low vessel under the cutting blade to collect cut food. However, such a mode of operation is not very ergonomic.

The purpose of this invention is to correct the aforementioned drawbacks and to propose a food-cutting appliance with optimized ergonomics in order to permit the user to slice or grate foods easily and in complete safety.

Another purpose of the invention is to propose a food-cutting appliance that has a simple design and is economical to use.

Another purpose of the invention is to propose a food-cutting appliance that can be cleaned and stored easily.

These purposes are achieved with an appliance for cutting foods, in particular fruit or vegetables, comprising a base and at least one cutting blade, characterized in that the base comprises a surface for receiving the food and a device for translational guidance of the cutting blade intended to be moved back and forth over the food by the user.

The food to be cut is then placed on the fixed receiving surface of the base and the cutting blade is mobile. Therefore, in use, the user's hand maneuvers the mobile cutting blade and no longer moves in relation to this cutting blade. Consequently, the risk of cutting the fingers is eliminated.

By "fixed receiving surface," it is understood that the receiving surface is fixed in relation to the base and in relation to an installation surface of the cutting appliance.

In its back-and-forth movement, the cutting blade is applied with pressure on the food resting on the fixed receiving surface of the base. The pressure is applied by the user, who may adapt this pressure in particular to the type of food to be cut. This allows cutting that is regular and of good quality.

Preferably, the base comprises means for holding the food on the receiving surface, these holding means advantageously consisting of spikes.

This arrangement makes it possible to immobilize the food to be cut on the receiving surface, in particular long foods lying flat.

Advantageously, the cutting blade is held by a cutting slide.

Preferably, the cutting blade is removably positioned on the cutting slide.

By "removable" or "dismountable," it is understood that the cutting blade and the cutting slide can easily be separated by the user, without the need to use a tool.

In this way, the cutting blade can be exchanged with a cutting blade having a different geometry, for example in order to grate or taper.

Preferably, the cutting appliance comprises a container forming with the cutting slide a vessel for collecting cut food.

In this way, the cutting slide and the cutting blade form at least partially the bottom of the vessel.

This arrangement makes it possible to collect the cut food in a closed vessel, without risk that they will spill on the work surface. Such a food-cutting appliance therefore presents optimized ergonomics.

Advantageously, the base comprises two edges that extend in a longitudinal direction and the guidance device comprises two ramps that are positioned respectively above the edges and extend in the longitudinal direction.

The cutting blade is intended to cooperate with the ramps, in particular by sliding, in order to permit the user to put the moving cutting blade over the food to be cut.

Advantageously, the cutting slide comprises two lateral guides intended to cooperate with the ramps.

This arrangement permits obtaining a cutting slide which holds the cutting blade and is mobile in translation along the longitudinal axis, and in this way, the user can establish a back-and-forth movement of the cutting blade over the food to be cut.

Preferably, the ramps are vertically mobile in relation to the base, between an upper extended position and a lower retracted position.

Advantageously, the ramps are mobile in vertical translation.

In this way, the position of the cutting slide which is supported on the mobile ramps and on the food is continuously adapted to the remaining thickness of the food to be cut. The distance between the receiving surface and the cutting slide resting on the ramps in the lower retracted position is close to zero and corresponds to a food that is completely cut.

Advantageously, the ramps and the holding means, in particular the holding spikes, are attached.

In this way, the holding means, in particular the spikes, are mobile simultaneously with the ramps between an upper extended position and a lower retracted position. In the upper extended position, the holding means, in particular the spikes, present a maximum holding length for the food to be cut. As the cutting takes place, the holding means, in particular the spikes, will go from the upper extended position to the lower retracted position, and their length will thus adapt to the remaining thickness of the food to be cut.

In a slightly degraded operating mode, the user can begin to cut a very thick food by positioning the cutting slide over the ramps. The holding means, in particular the spikes, being in the upper extended position, they hold the food well. Then, while the food is being cut, the cutting slide will be supported by the mobile ramps so that the extended position of the holding means, in particular the spikes, can be adapted to the remaining thickness of the food.

Preferably, the cutting appliance comprises a system for translational guidance of the ramps on the base, said guidance system comprising in particular columns, advantageously positioned close to the edges of the base.

This arrangement permits obtaining translational guidance of the ramps in the base in a particularly simple, effective and economical manner.

Advantageously, the receiving surface comprises perforations that cooperate with the spikes. The system for translational guidance of the ramps on the base comprises the perforations and spikes.

In one variant, the ramps each comprise a piece for connection with a panel, the base comprising vertical openings through which the connection pieces pass.

Advantageously, the system for translational guidance of the ramps on the base comprises the connection pieces and the vertical openings.

Advantageously, the base comprises means for returning the ramps to the upper extended position, said return means being in particular spring means.

This arrangement makes it possible to maintain contact between the cutting slide and the ramps while the food is being cut.

Advantageously, the container comprises an outer face which forms a gripping part.

This arrangement permits obtaining a compact vessel for collecting cut food, without additional gripping part.

Preferably, the container is removably positioned on the cutting slide.

The container positioned on the cutting slide thus forms a vessel for collecting cut food. The removable container of the cutting slide permits easily emptying the vessel. This arrangement therefore permits obtaining a cutting appliance that is particularly ergonomic with regard to the manipulation of cut food.

In addition, the outer face of the container forming the gripping part covers the cutting blade and makes the latter inaccessible to the user's hand. The gripping part has a large gripping surface to permit safe handling. In this way, a cutting appliance that can be used in complete safety is obtained.

Advantageously, the cutting appliance comprises a non-slip foot, in particular a suction cup.

This arrangement permits the cutting appliance to be used on any type of support, in particular a smooth or wet one, on which it might slip during use.

The invention will be more fully understood in consideration of the embodiment, which is in no way restrictive, illustrated in the attached figures, in which.

Figure 1:
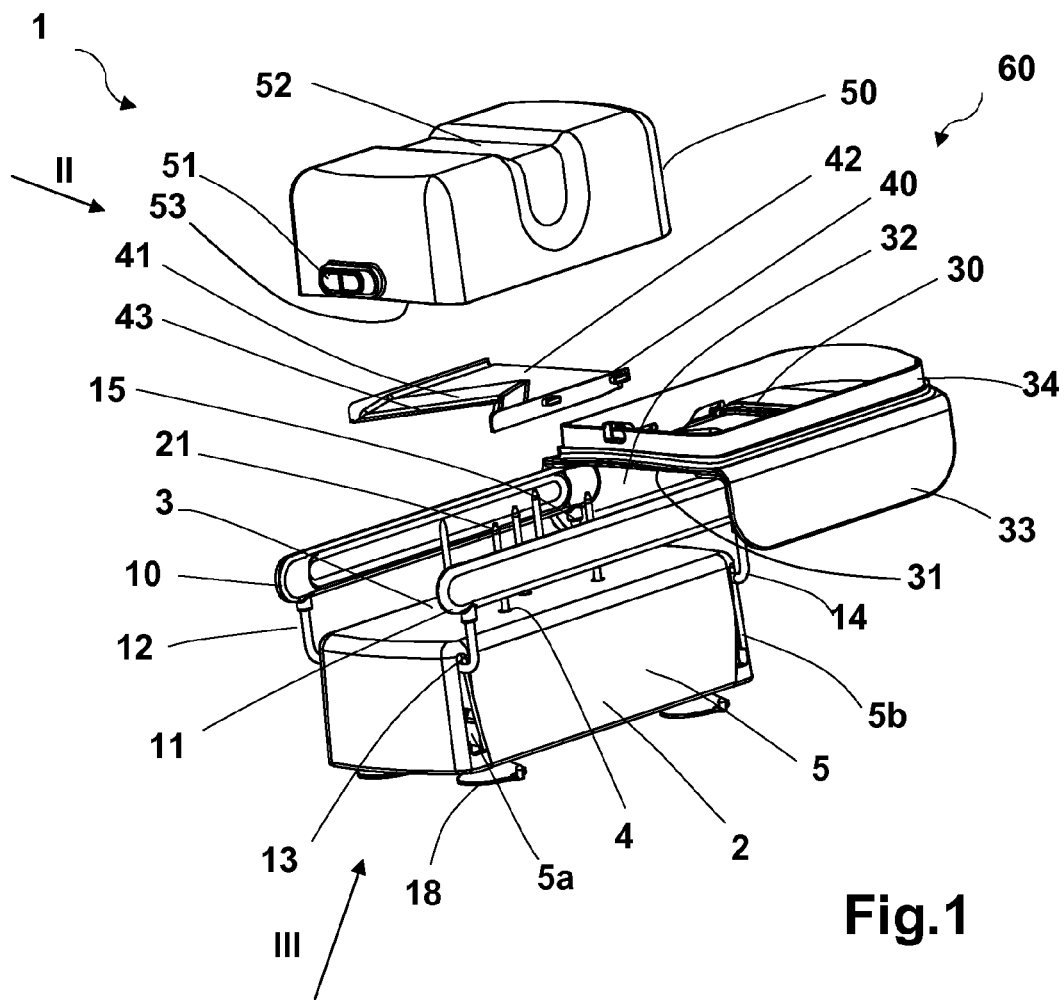
FIG. 1 illustrates an exploded perspective view of a cutting appliance according to a particular embodiment of the invention, the ramps and the spikes being in the upper extended position.

According to the embodiment visible in FIGS. 1 to 5, a food-cutting appliance 1 comprises a base 2 equipped with two lateral guidance ramps 10, 11 intended to cooperate with a cutting slide 30 equipped with a cutting blade 40. The base 2 has a parallelepipedal shape which comprises a flat upper surface forming a surface 3 for receiving the food to be cut. A panel 20 (FIGS. 3 to 5) is positioned inside the base 2, under the receiving surface 3. The panel 20 comprises spikes 21 formed by metal rods which extend upward through perforations 4 arranged in the receiving surface 3.

The base 2 comprises two edges 5, 6 above which are arranged the ramps 10, 11. The ramps 10, 11 present a roughly rectangular cross-section and extend longitudinally on the length of the base 2. The ramps 10, 11 comprise at each extremity a piece 12, 13, 14, 15 for connection with the panel 20. The connection piece 12, 13, 14, 15 is formed of a bent metal wire attached to the ramps 10, 11 and the panel 20. The edges 5, 6 comprise vertical openings 5a, 5b, 6a, 6b through which pass the connection pieces 12, 13, 14, 15.

Figure 2:
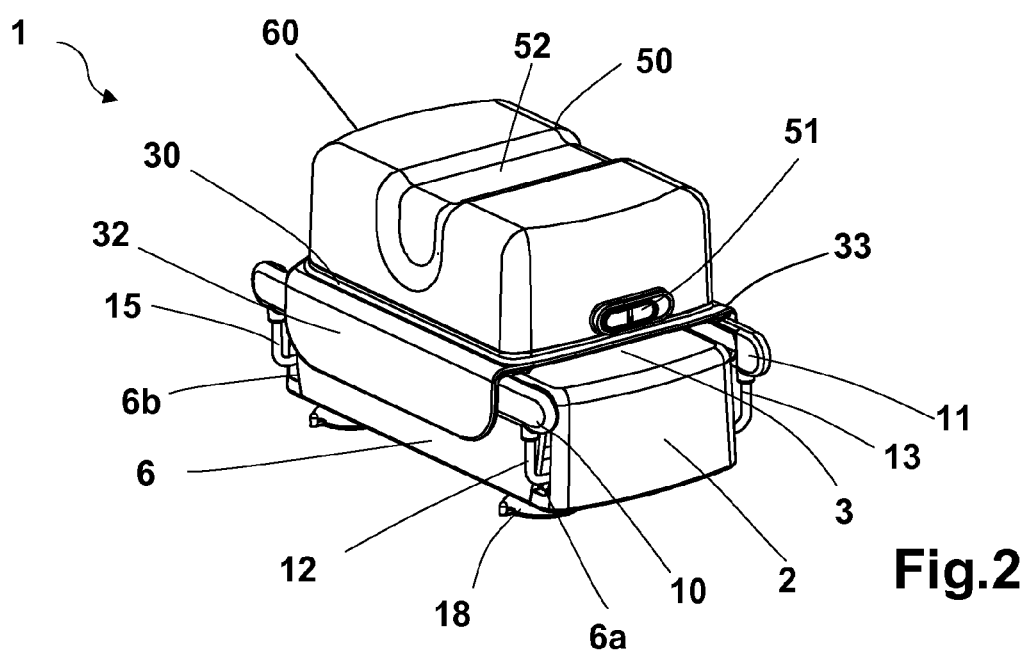
FIG. 2 illustrates a perspective view of the cutting device according to a direction II illustrated in FIG. 1, the ramps and the spikes being in the lower retracted position.
Figure 3:
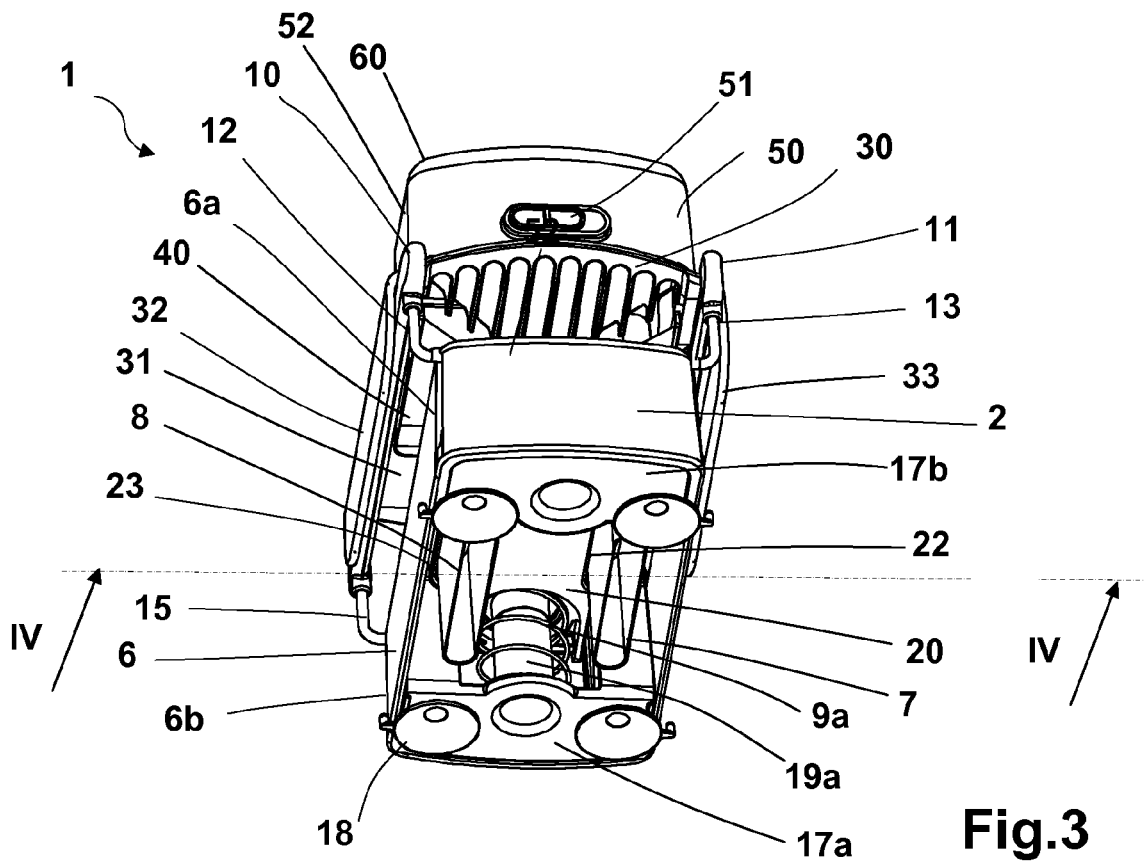
FIG. 3 illustrates a perspective view of the cutting device according to the direction III illustrated in FIG. 1.
Figure 4:
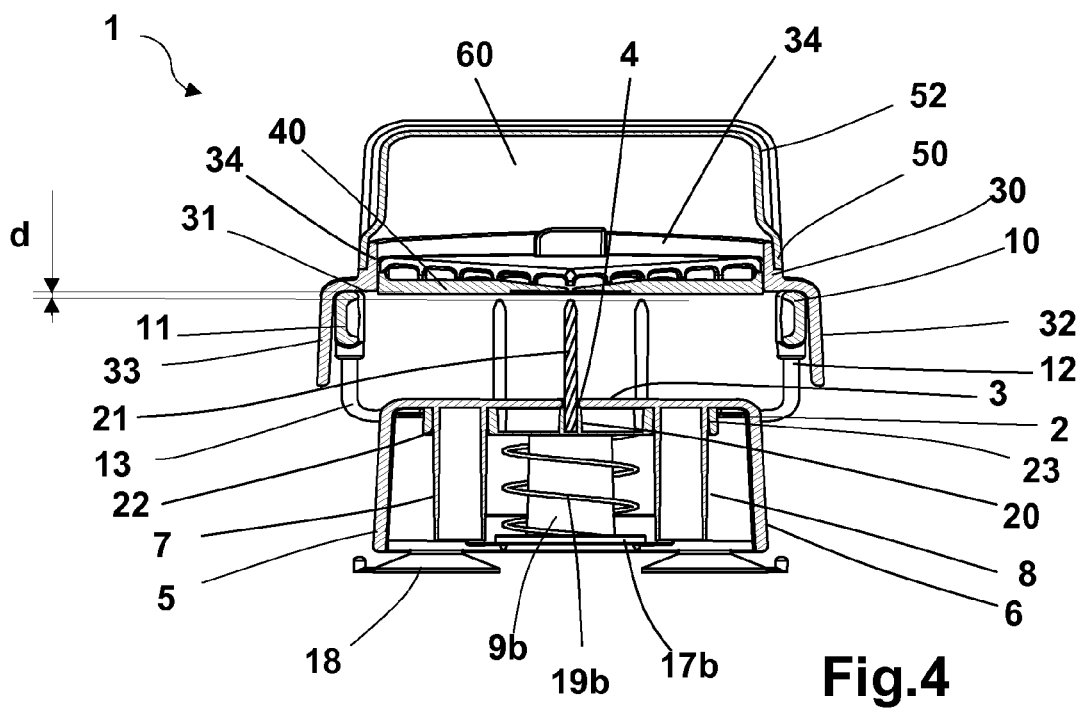
FIG. 4 illustrates a schematic sectional view of the cutting device according to the line IV-IV illustrated in FIG. 3.

The ramps 10, 11, the spikes 21 and the panel 20 form an assembly (FIG. 5) which is mobile in vertical translation in relation to the base 2 between an upper extended position (FIGS. 1, 3 and 4) and a lower retracted position (FIG. 2). As visible in FIGS. 4 and 5, the base 2 comprises two columns 7, 8 having an oblong cross-section and extending vertically from the receiving surface 3. The panel 20 comprises two openings 22, 23 intended to cooperate with the columns 7, 8 with oblong cross-section in order to ensure the translational guidance of the panel 20.

Figure 5:
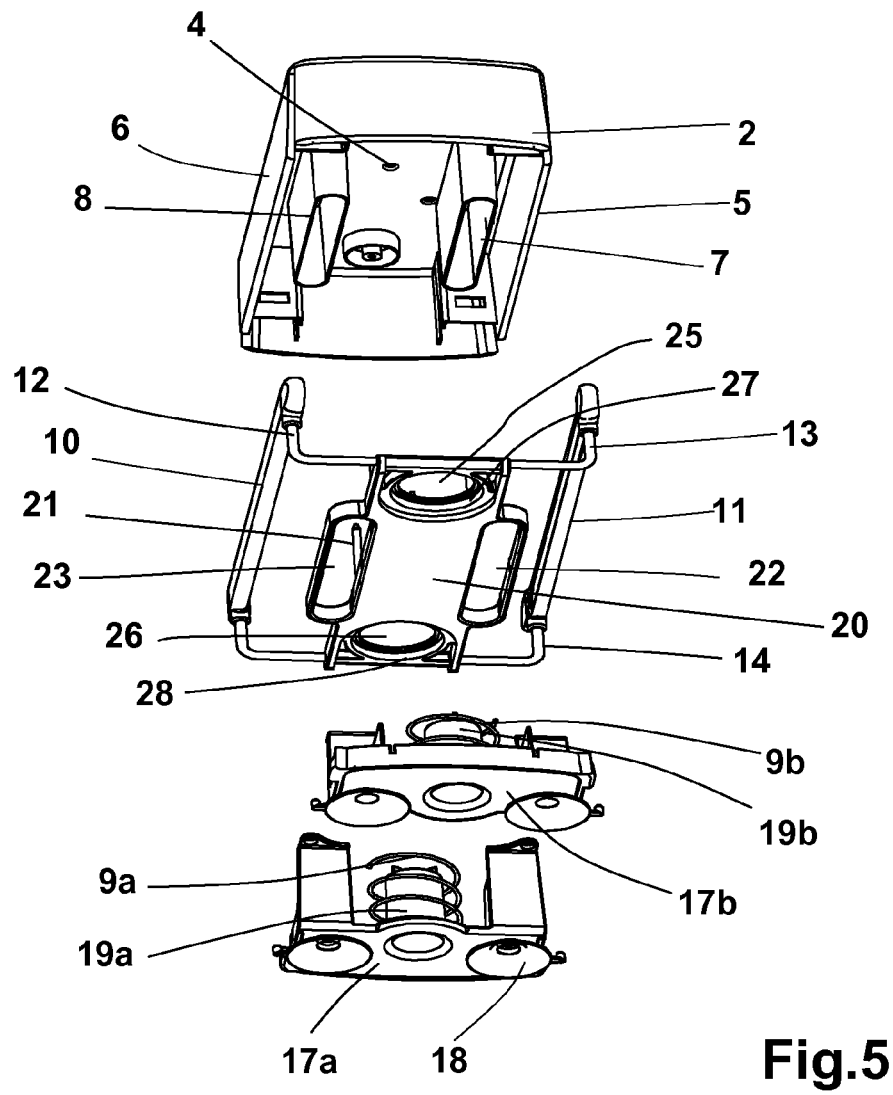
FIG. 5 illustrates an exploded perspective view of the base of the cutting device illustrated in FIG. 3.

As visible on FIG. 5, the base 2 comprises two lower cowl-halves 17a, 17b comprising respectively the columns 19a and 19b having a circular cross-section. The base 2 comprises means for returning the assembly formed by the ramps 10, 11, the spikes 21 and the panel 20 to the upper extended position. The return means comprise two springs 9a, 9b arranged around two columns 19a, 19b arranged in two openings 25, 26. The two springs 9a, 9b are supported on two flanges 27, 28 of the panel 20 and on the base of the lower cowl-halves 17a, 17b. The lower cowl-halves 17a, 17b comprise four non-slip feet 18 formed of suction cups.

As visible in FIG. 1, the cutting appliance 1 comprises a mobile assembly which is formed by the cutting slide 30 equipped with the cutting blade 40 and a container 50 and which is intended to cooperate with the ramps 10, 11 in order to permit the user to establish a back-and-forth movement of the cutting blade 40 over the food to be cut. This assembly forms a vessel 60 for collecting cut food.

The cutting slide 30 has a roughly rectangular shape and comprises a lower face 31 and two lateral guides 32, 33 extending downward and intended to cooperate with the ramps 10, 11.

The cutting blade 40 comprises a metal part 41 and a frame 42. The frame 42 is obtained by an overmolding operation on the metal part 41. The cutting blade 40 is positioned such that it can be detached from the cutting slide 30. The metal part 41 comprises a cutting edge 43 which projects beyond the lower face 31 of the cutting slide 30 by a height e which determines the thickness of the cut part of the food. When the cutting slide 30 is positioned on the ramps 10, 11, the ends of the spikes 21 are placed at a distance d (FIG. 4) from the lower face 31 which is greater than the height e.

The container 50 is positioned on the cutting slide 30 in a detachable manner. The container 50 comprises an opening 53 which cooperates with a top peripheral border 34 of the cutting slide 30 in order to form the collection vessel 60. Advantageously, the container 50 comprises a lock 51 that can move between a position where the container 50 is locked on the cutting slide 30 and a position where the container 50 is unlocked on the cutting slide 30.

The container 50 comprises an outer face 52 which forms a gripping area of the collection vessel 60.

During operation, the user sticks the food to be cut on the spikes 21 until the food is supported on the receiving surface 3. Then, the user selects the cutting blade 40 corresponding to the type of cut desired and assembles it on the cutting slide 30. He then assembles the container 50 on the cutting slide 30 in order to form a vessel 60 for receiving cut food. He takes hold of the outer face 52 of the container 50 which acts as gripping member, positions the lateral guides 32, 33 along the ramps 10, 11 and places the lower face 31 of the cutting slide 30 on the ramps 10, 11, over the food to be cut. He then presses on the container 50 in order to make the ramps 10, 11 translate downward and thus bring the lower face 31 of the cutting slide 30 into contact with the food. The cutting edge 43 of the cutting blade 40 is positioned facing the food.

The user moves in horizontal translation the assembly formed by the container 50 and the cutting slide 30 equipped with the cutting blade 40, which results in slicing a portion of thickness e of the food. The user then restores the assembly to the initial position. He presses on the container 50 to bring the lower face 31 of the cutting slide 30 into contact with the food
by making the ramps 10, 11 and the spikes 21 translate downward on a course equal to the thickness e.

The user will then repeat the back-and-forth movement as many times as necessary in order to completely cut the food, the cut parts of which are collected in the vessel 60.

Of course, the invention is in no way limited to the embodiment described and illustrated, which has been provided only as an example. Modifications are still possible, in particular from the point of view of composition of the various components or by substitution of equivalent techniques, without departing from the scope of protection of the invention.

Thus, in one variant, the cutting appliance comprises a member for locking the ramps and spikes into the upper extended position in order to permit the spikes to be inserted into the food to be cut when the food is placed on the receiving surface.

In another variant, the system for translational guidance of the ramps on the base comprises guide rods of the panel.

The invention claimed is:

1. Appliance for cutting foods, comprising a base, and at least one cutting blade, wherein the base comprises a fixed receiving surface for receiving the food and a translational guidance device for translational guidance of the cutting blade intended to be moved back and forth over the food by a user, the translational guidance device comprising two ramps adapted to guide a movement of the cutting blade, the two ramps being supported by the base and being vertically movable relative to the base between an upper extended position and a lower retracted position, wherein the cutting blade is held by a cutting slide, and wherein the two ramps are adapted to guide a translational movement of the cutting slide for cutting the food and wherein the fixed receiving surface for receiving the food is provided below the cutting slide so that the food cut by the cutting blade is collected on or above the cutting slide.

2. The appliance for cutting foods according to claim 1, wherein the base comprises holding means for holding the food on the fixed receiving surface.

3. The appliance for cutting foods according to claim 1, wherein the cutting blade is removably positioned on the cutting slide.

4. The appliance for cutting foods according to claim 1, further comprising a container forming, with the cutting slide, a vessel for collecting cut food.

5. The appliance for cutting foods according to claim 4, wherein the container comprises an outer face which forms a gripping part.

6. The appliance for cutting foods according to claim 4, wherein the container is removably positioned on the cutting slide.

7. The appliance for cutting foods according to claim 1, wherein the base comprises two edges which extend in a longitudinal direction of the base and wherein the two ramps are positioned respectively above the two edges and which extend in the longitudinal direction.

8. The appliance for cutting foods according to claim 7, wherein the cutting slide comprises two lateral guides intended to cooperate with the ramps.

9. The appliance for cutting foods according to claim 7, wherein the base comprises holding means for holding the food on the fixed receiving surface and wherein the ramps and the holding means are attached to each other.

10. The appliance for cutting foods according to claim 9, wherein the holding means consist of spikes.

11. The appliance for cutting foods according to claim 7, further comprising a system for translational guidance of the ramps on the base.

12. The appliance for cutting foods according to claim 11, wherein said guidance system comprises columns that are positioned close to the two edges of the base.

13. The appliance for cutting foods according to claim 1, wherein the base comprises return means for returning the ramps to the upper extended position.

14. The appliance for cutting foods according to claim 13, wherein said return means are springs.

15. The appliance for cutting foods according to claim 1, further comprising at least one non-slip foot.

16. The appliance for cutting foods according to claim 15, wherein the at least one non-slip foot is a suction cup.

17. The appliance for cutting foods according to claim 1, wherein the foods are fruits or vegetables.

18. The appliance for cutting foods according to claim 1, wherein the base comprises a spring to force the two ramps to return to the upper extended position.

* * * * *